(12) United States Patent
Mulligan

(10) Patent No.: US 6,739,125 B1  
(45) Date of Patent: May 25, 2004

(54) INTERNAL COMBUSTION ENGINE WITH SCR AND INTEGRATED AMMONIA PRODUCTION

(75) Inventor: D. Neal Mulligan, Reno, NV (US)

(73) Assignee: Collier Technologies, Inc., Reno, NV (US)

( * ) Notice: Subject to any disclaimer, the term of this patent is extended or adjusted under 35 U.S.C. 154(b) by 9 days.

(21) Appl. No.: 10/293,020

(22) Filed: Nov. 13, 2002

(51) Int. Cl.⁷ .................................................. F01N 3/00
(52) U.S. Cl. .............................. 60/286; 60/274; 60/303; 123/1 A; 123/DIG. 12
(58) Field of Search .......................... 60/274, 286, 295, 60/299, 301, 303, 278, 288; 123/1 A, 267, DIG. 12, DIG. 13; 422/182, 183, 177

(56) References Cited

U.S. PATENT DOCUMENTS

| | | |
|---|---|---|
| 1,275,252 A | 8/1918 | Harris |
| 1,404,223 A | 1/1922 | Rose et al. |
| 1,505,338 A | 8/1924 | Harris |
| 1,628,066 A | 5/1927 | Rose |
| 1,863,636 A | 6/1932 | Quelch |
| 1,936,155 A | 11/1933 | De Florez |
| 1,936,156 A | 11/1933 | De Florez |
| 2,956,093 A | 10/1960 | Nicolai |
| 3,759,678 A | 9/1973 | Chamberland et al. |
| 3,759,679 A | 9/1973 | Franz et al. |
| 3,825,487 A | 7/1974 | Wilhelm |
| 3,855,980 A | 12/1974 | Weisz et al. |
| 3,918,412 A | 11/1975 | Lindstrom |
| 3,929,431 A | 12/1975 | Koh et al. |
| 3,943,236 A | 3/1976 | Green |
| 3,976,034 A | 8/1976 | Shinohara et al. |
| 3,982,878 A | 9/1976 | Yamane et al. |
| 3,982,910 A | 9/1976 | Houseman et al. |
| 4,059,076 A | 11/1977 | Kosaka et al. |
| 4,073,716 A | 2/1978 | Pfefferle et al. |

(List continued on next page.)

FOREIGN PATENT DOCUMENTS

| | | |
|---|---|---|
| DE | 3048540 | 7/1982 |
| GB | 2258012 A | 1/1993 |
| JP | 61171870 | 8/1986 |
| JP | 2116603 | 5/1990 |
| JP | 05-200252 A | 8/1993 |
| WO | WO 8500159 | 1/1985 |
| WO | WO 9423188 | 10/1994 |

*Primary Examiner*—Binh Tran  
(74) *Attorney, Agent, or Firm*—Christie, Parker & Hale, LLP

(57) ABSTRACT

$NO_x$ emissions from an internal combustion engine fueled by a gaseous hydrocarbon fuel can be reduced by catalytically producing a hydrogen and carbon monoxide fuel gas stream from the gaseous hydrocarbon fuel and a portion of the hot exhaust gas from the internal combustion engine. Furthermore, ammonia is also produced catalytically by reacting a portion of the hydrogen produced with ambient nitrogen present in the exhaust gas. The ammonia produced is used in connection with a selective catalytic reduction reactor to treat the remaining hot exhaust gas produced from the internal combustion engine, resulting in a treated exhaust gas stream having near-zero $NO_x$ emissions.

20 Claims, 1 Drawing Sheet

U.S. PATENT DOCUMENTS

| | | |
|---|---|---|
| 4,086,877 A | 5/1978 | Henkel et al. |
| 4,112,876 A | 9/1978 | Mentschel |
| 4,131,086 A | 12/1978 | Noguchi et al. |
| 4,143,620 A | 3/1979 | Noguchi et al. |
| 4,147,136 A | 4/1979 | Noguchi et al. |
| 4,175,386 A | 11/1979 | Katahira et al. |
| 4,184,461 A | 1/1980 | Leung |
| 4,199,938 A | 4/1980 | Nakase et al. |
| 4,213,435 A | 7/1980 | Simko |
| 4,223,642 A | 9/1980 | Okubo |
| 4,244,023 A | 1/1981 | Johnson |
| 4,244,328 A | 1/1981 | Lindstrom |
| 4,284,053 A | 8/1981 | Merrick |
| 4,318,369 A | 3/1982 | Cronyn |
| 4,328,781 A | 5/1982 | Morita |
| 4,337,170 A | 6/1982 | Fuderer |
| 4,340,013 A | 7/1982 | Lindstrom |
| 4,358,364 A | 11/1982 | Klosek et al. |
| 4,375,746 A | 3/1983 | Hattori |
| 4,376,097 A | 3/1983 | Emelock |
| 4,376,427 A | 3/1983 | Mizuno |
| 4,406,261 A | 9/1983 | Ikeura |
| 4,425,876 A | 1/1984 | Rutledge et al. |
| 4,444,158 A | 4/1984 | Yoon |
| 4,471,738 A | 9/1984 | Smojver |
| 4,473,490 A | 9/1984 | Stewart |
| 4,475,484 A | 10/1984 | Filho et al. |
| 4,476,817 A | 10/1984 | Lindberg |
| 4,499,872 A | 2/1985 | Ward et al. |
| 4,508,064 A | 4/1985 | Watanabe |
| 4,512,304 A | 4/1985 | Snyder |
| 4,520,763 A | 6/1985 | Lynch et al. |
| 4,535,736 A | 8/1985 | Taura et al. |
| 4,547,356 A | 10/1985 | Papineau |
| 4,569,890 A | 2/1986 | Barthel |
| 4,617,892 A | 10/1986 | Staerzl |
| 4,635,609 A | 1/1987 | Seppen et al. |
| 4,643,666 A | 2/1987 | Green et al. |
| 4,696,279 A | 9/1987 | Lindberg |
| 4,722,303 A | 2/1988 | Leonhard |
| 4,730,590 A | 3/1988 | Sogawa |
| 4,873,961 A | 10/1989 | Tanaka |
| 4,900,333 A | 2/1990 | Bos |
| 4,908,765 A | 3/1990 | Murakami et al. |
| 4,919,844 A | 4/1990 | Wang |
| 5,004,592 A | 4/1991 | Pinto |
| 5,081,977 A | 1/1992 | Swenson |
| 5,123,397 A | 6/1992 | Richeson |
| 5,139,002 A | 8/1992 | Lynch et al. |
| 5,156,114 A | 10/1992 | Gunnerman |
| 5,176,809 A | 1/1993 | Simuni |
| 5,185,139 A | 2/1993 | Krishnamurthy et al. |
| 5,207,185 A | 5/1993 | Greiner et al. |
| 5,248,566 A | 9/1993 | Kumar et al. |
| 5,251,601 A | 10/1993 | Leshner et al. |
| 5,272,871 A * | 12/1993 | Oshima et al. ............... 60/274 |
| 5,284,113 A | 2/1994 | Svensson |
| 5,293,857 A | 3/1994 | Meyer |
| 5,297,515 A | 3/1994 | Gale et al. |
| 5,299,536 A | 4/1994 | Moard et al. |
| 5,339,634 A | 8/1994 | Gale et al. |
| 5,388,402 A | 2/1995 | Aoki et al. |
| 5,410,872 A | 5/1995 | Adamczyk, Jr. et al. |
| 5,448,885 A | 9/1995 | Atanasyan |
| 5,483,939 A | 1/1996 | Kamura et al. |
| 5,488,932 A | 2/1996 | Serafini |
| 5,516,967 A | 5/1996 | Pandey et al. |
| 5,586,433 A * | 12/1996 | Boegner et al. ............... 60/274 |
| 5,592,925 A | 1/1997 | Machida et al. |
| 5,609,144 A | 3/1997 | Seizew et al. |
| 5,660,602 A | 8/1997 | Collier, Jr. et al. |
| 5,666,923 A | 9/1997 | Collier, Jr. et al. |
| 5,671,600 A | 9/1997 | Pischinger et al. |
| 5,720,266 A | 2/1998 | Nogi et al. |
| 5,725,616 A | 3/1998 | Lynum et al. |
| 5,763,351 A | 6/1998 | Ichimura |
| 5,782,087 A * | 7/1998 | Kinugasa et al. ............. 60/276 |
| 5,787,864 A | 8/1998 | Collier, Jr. et al. |
| 5,809,774 A | 9/1998 | Peter-Hoblyn et al. |
| 5,814,283 A | 9/1998 | Matuoka et al. |
| 5,852,927 A | 12/1998 | Cohn et al. |
| 5,943,859 A * | 8/1999 | Kawamura ................... 60/320 |
| 5,947,063 A | 9/1999 | Smith et al. |
| 5,972,829 A | 10/1999 | Ichimura |
| 6,026,787 A | 2/2000 | Sun et al. |
| 6,079,373 A | 6/2000 | Kawamura |
| 6,122,909 A * | 9/2000 | Murphy et al. ............... 60/286 |
| 6,136,283 A | 10/2000 | Stern |
| 6,176,078 B1 * | 1/2001 | Balko et al. .................. 60/274 |
| 6,205,957 B1 | 3/2001 | Saylor |
| 6,266,955 B1 | 7/2001 | Liang et al. |
| 6,334,986 B2 | 1/2002 | Gieshoff et al. |
| 6,357,227 B1 | 3/2002 | Neufert |
| 6,397,790 B1 | 6/2002 | Collier, Jr. |
| 6,405,720 B1 | 6/2002 | Collier, Jr. |
| 6,508,209 B1 | 1/2003 | Collier, Jr. |

\* cited by examiner

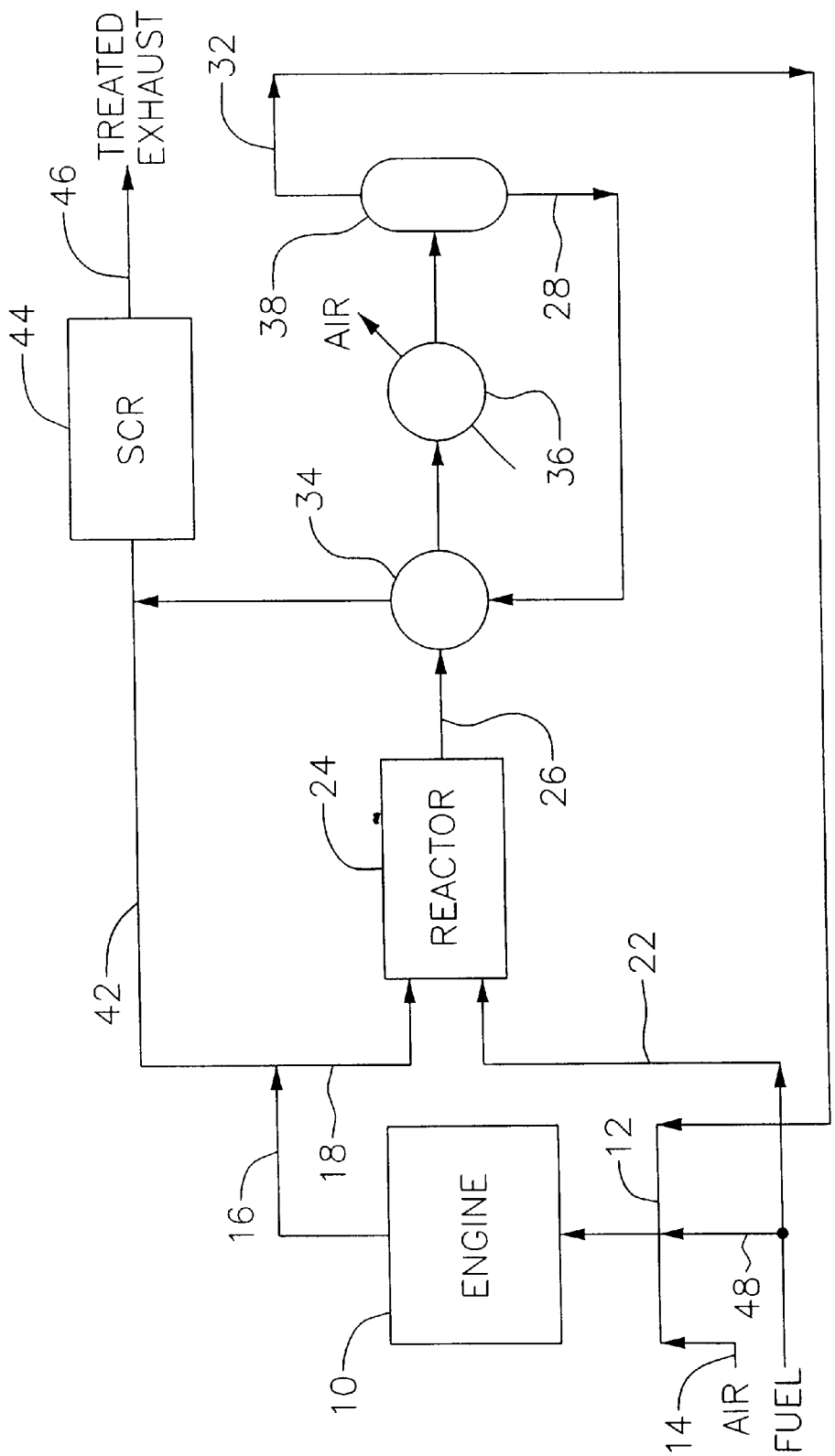

INTERNAL COMBUSTION ENGINE WITH SCR AND INTEGRATED AMMONIA PRODUCTION

FIELD OF THE INVENTION

This invention relates to an emission control system for use with a gaseous fuel powered internal combustion engine. More particularly, it relates to a system for producing a source of hydrogen for supplementing the fuel for the engine and for producing a source of ammonia for use in a selective catalytic reduction reactor used to treat the exhaust gas stream, thereby producing an exhaust gas with near-zero NOx emissions.

BACKGROUND OF THE INVENTION

Hydrogen is known to burn cleaner in internal combustion engines than more traditional fuels such as gasoline and diesel. However, hydrogen is difficult to store, and convenient sources of hydrogen are not readily available. Light hydrocarbons such as methane, propane and butane, and mixtures of light hydrocarbons such as natural gas are more readily available than hydrogen and easier to store than hydrogen. While such fuels tend to burn cleaner than gasoline or diesel, such gases are not as clean burning as hydrogen. Current production engines can often use such alternative fuels without any substantial engine modification, and when operating under lean-burn conditions, such fuels can result in low emission levels that are below current legal standards.

According to U.S. Pat. Nos. 5,660,602; 5,666,923 and 5,787,864 which are incorporated by reference, a clean burning alternative gaseous fuel is disclosed for use in internal combustion engines. Such a fuel includes approximately 21 to 50% hydrogen and the balance natural gas.

According to U.S. Pat. No. 6,397,790 and pending application Ser. No. 09/541,541 which are incorporated by reference, apparatus and methods can be used to produce hydrogen from gaseous fuels for combustion in internal combustion engines. According to these U.S. Pat. and U.S. Pat. No. 6,405,720 which is also incorporated by reference, emissions can further be reduced by using high levels of exhaust gas recirculation in internal combustion.

SUMMARY OF THE INVENTION

According to the present invention, a method and apparatus for reducing the emissions from a lean burn internal combustion engine are set forth. The internal combustion engine is generally of the type that burns a mixture of fuel and air, producing a hot exhaust gas stream containing steam, nitrogen, NOx, and oxygen. The method includes a reaction step for reacting a first portion of the hot exhaust gas stream with a source of fuel gas in a reactor to produce an intermediate exhaust stream containing hydrogen. At least a portion of the hydrogen is further reacted with nitrogen to form ammonia. The resulting intermediate exhaust gas stream which now contains ammonia and hydrogen is cooled, condensing ammonia-saturated water. The remaining gaseous components consisting of hydrogen, ammonia, nitrogen, carbon dioxide, and unreacted fuel are then recycled to the internal combustion engine to either supplement the fuel to the internal combustion engine, or if a sufficient amount of combustibles are present, the recycled gas is the exclusive source of fuel for the internal combustion engine.

The condensed ammonia-saturated water is vaporized through heat exchange with the intermediate exhaust stream leaving the reactor. This vapor is then mixed with a second portion of the exhaust gas stream where it is reacted in a selective catalytic reduction reactor to produce a treated exhaust stream substantially free of NOx. Optionally, the treated exhaust gas stream may be further treated by known oxidation reactions to remove any remaining carbon monoxide. The source of oxygen for such oxidation reactions is the hot exhaust gas stream when the engine is operated under lean burn conditions.

BRIEF DESCRIPTION OF THE DRAWINGS

The drawing FIGURE is a schematic representation of the emission control system of the present invention.

DETAILED DESCRIPTION OF THE INVENTION

Referring to the drawing FIGURE, an internal combustion engine using the emission control system of the present invention is illustrated schematically. The invention is intended for use with a lean-burn internal combustion engine 10 of the type that includes an intake manifold 12 for receiving combustion air 14 and fuel, and which produces a hot exhaust gas stream 16. Examples of such internal combustion engines include piston engines, rotary engines, and turbine engines. The primary constituents of such a hot exhaust gas stream are water vapor, nitrogen, and carbon dioxide. Because the internal combustion engine is operated under lean-burn conditions, the hot exhaust gas stream will also include an amount of unused oxygen. Additionally, pollutants such as oxides of nitrogen ($NO_x$) and carbon monoxide are generally found in the hot exhaust gas stream. When using the emission control system of the present invention, the volumetric concentrations of the various constituents of the hot exhaust gas stream will be between about 6 and 7% carbon dioxide, between about 72 and 75% nitrogen, between about 5 and 8% water vapor, between about 0.5 and 10% oxygen, between about 1 ppm and 10 ppm $NO_x$, and between about 250 and 800 ppm carbon monoxide. For purposes of this specification, unless otherwise set forth, all percentages and concentrations are provided on a volumetric basis.

According to the embodiment illustrated, the hot exhaust gas stream exits the internal combustion engine and splits into two streams. The first hot exhaust gas stream 18 is combined with a source of hydrocarbon fuel gas 22 and fed to a catalytic reactor 24. Preferred hydrocarbon fuel gases include methane, propane, butane and combinations of such gases. A particularly preferred hydrocarbon fuel gas is natural gas which consists primarily of methane with small amounts of ethane, propane, butanes, higher order hydrocarbons such as pentanes and hexanes, and relatively inert gases and impurities such as carbon dioxide. One skilled in the art will recognize that while the term "hydrocarbon fuel gas" is used in this specification, the term is meant to broadly refer to fuels such as propane, butane, and higher order hydrocarbons which can be stored in a liquid form, but which are readily vaporized to a gaseous form.

In the catalytic reactor, a portion of the water vapor from the hot exhaust gas stream reacts with the hydrocarbons of the hydrocarbon fuel gas to form hydrogen. This is achieved by well-known reforming reactions. For methane, the reaction is a two-step reaction with the first step being the steam reforming reaction:

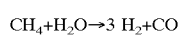

$CH_4 + H_2O \rightarrow 3\ H_2 + CO$

In the second step, a portion of the carbon monoxide is further reacted with additional water vapor according to the water-gas shift reaction:

$$CO + H_2O \rightarrow H_2 + CO_2$$

In order to support the reactions set forth above, in one embodiment of the invention, the ratio of hydrocarbon fuel gas to hot exhaust gas entering the catalytic reactor is maintained between about 0.02 and 0.35.

In addition to providing the necessary water vapor for the above reactions, the high temperature of the hot exhaust gas stream supplies at least a portion of the heat necessary to promote the endothermic part of the reforming reaction. Additional heat may be provided by the partial oxidation of a portion of the hydrocarbons from the fuel gas. Because the internal combustion engine operates under lean-burn conditions, the unused oxygen present in the hot exhaust gas is generally sufficient to promote some partial oxidation reactions in the catalytic reactor without the need for additional oxygen. Not only does the partial oxidation reaction supply additional heat to the reactor, it has the added benefit of producing additional hydrogen and carbon monoxide. The partial oxidation reaction for methane can be described by the following reaction:

$$CH_4 + \tfrac{1}{2}O_2 \rightarrow 2H_2 + CO$$

As mentioned above, the reforming reactions are generally endothermic. Without the introduction of additional heat to the reactants, the temperature of the reactor can tend to drop. As the reaction temperature drops, the reaction equilibrium tends to shift to favor formation of hydrocarbons rather than hydrogen and carbon monoxide. In one embodiment of the invention, the reactor temperature is controlled by increasing or decreasing the partial oxidation reactions. This is done by controlling the amount of air introduced to the internal combustion engine and more particularly by controlling the fuel to air ratio for the internal combustion engine. By increasing the air levels relative to the fuel levels, the levels of oxygen in the exhaust will tend to increase, promoting the partial oxidation reactions and raising the reactor temperature. In yet another embodiment, an amount of additional air or other source of oxygen can be introduced directly to the reactor.

In addition to using partial oxidation to supplement the heat provided by the first hot exhaust gas stream, the heat remaining in the balance of the hot exhaust gas stream can be recovered and used as heat for the reforming reactions. In one example, such heat can be recovered by passing the balance of the hot exhaust gas stream through a heat exchanger to heat the hydrocarbon fuel gas. In another example, the catalytic reactor can be provided with multiple stages. Between each stage, the intermediate reactants can be heated in a heat exchanger through which the balance of the hot exhaust gas stream is passed. In still another example, the catalytic reactor may include a jacket through which the balance of the hot exhaust gas stream is passed.

The catalytic reactor can take various forms. In exemplary embodiments, a suitable reforming catalyst is provided on Raschig rings packed within a reactor vessel, or on a ceramic, cordierite, or metal matrix monolith construction placed within a reactor vessel. Suitable catalysts include any metal which promotes the reformation reaction. Preferred catalysts include nickel-based catalysts. According to one embodiment, about 10% of the hydrocarbons in the fuel gas are converted by the reactions described above. In another embodiment, a suitable catalyst, reactor space velocity, and reactor temperature is chosen to selectively convert particular hydrocarbons in the hydrocarbon fuel gas. For example, because methane requires a relatively high temperature to convert, reactor parameters can be chosen to selectively convert the non-methane hydrocarbons in the hydrocarbon fuel gas such that little of the methane is converted. This is particularly beneficial when the natural gas contains high amounts of non-methane hydrocarbons.

The catalytic reactor will generally operate at a fairly high temperature in the range of about 450° to 800° C. The optimum temperature will depend to some extent on the space velocity within the reactor as well as the level of reformation desired. While higher temperatures generally promote the desired reforming reactions, high reactor temperatures can result in higher exhaust gas $NO_x$ emissions. Therefore, a preferred range of operation for the reactor is about 500° to about 600° C.

In addition to catalytically reforming the fuel gas to produce a syngas containing hydrogen and carbon monoxide, the catalytic reactor also converts a portion of the nitrogen present in the hot exhaust gas to ammonia by the following reaction:

$$N_2 + 3H_2 \rightarrow 2NH_3$$

According to one embodiment, this reaction takes place simultaneously with the reforming reaction through the use of a suitable catalyst. In another embodiment, separate catalytic reactors may be used, the first for producing hydrogen and carbon monoxide by the reforming reactions and the second for producing ammonia. In yet another embodiment, the reforming reactions and ammonia-production reactions are carried out in two different reaction zones within a single catalytic reactor. In one example of such an embodiment, a single reactor includes two catalytic sections arranged in series. Suitable catalysts for the ammonia production reaction are nickel and/or ruthenium-based, and may be provided on a suitable carrier such as those disclosed above for the reforming catalyst.

According to the above reactions, the reactor effluent 26 contains unreacted fuel gas, hydrogen, carbon monoxide, ammonia, water vapor, nitrogen, carbon dioxide and possibly other constituents such as $NO_x$. The temperature of the reactor effluent will generally be in the range of 400° to 600° C. The reactor effluent will contain sufficiently high levels of water vapor that, if recycled directly to the internal combustion engine, some of the water vapor might condense, leading to poor engine performance. Therefore, at least a portion of the water vapor should be removed from the reactor effluent. According to such an embodiment, the reactor effluent is cooled and the resulting condensate and gas mixture are separated from one another. Since ammonia has an affinity for water, an additional benefit of such a separation step is to separate at least a portion of the ammonia from the reactor effluent. The result of the separation step is to produce an ammonia-rich stream of condensed water 28 and a hydrogen-rich recycle gas stream 32. In order to remove a sufficient amount of water vapor from the reactor effluent to permit high levels of recycle, it is generally desired to cool the reactor effluent to a temperature in the range of about 13° to 50° C.

In the embodiment shown in the drawing FIGURE, the separation of the ammonia-rich stream of water from the hydrogen-rich recycle gas stream is achieved by cooling the reactor effluent in a heat exchanger (36). In this heat exchanger, the reactor effluent is cooled using ambient air. The cooled reactor effluent then passes into a separator 38 where the hydrogen-rich recycle gas stream exits from the top of the separator and the ammonia-rich condensed water stream is drawn from the bottom of the separator. The liquid ammonia-rich stream of water exiting separator 38 then passes through a second heat exchanger 34 where it is vaporized by heat transfer with the hot reactor effluent gases. It should be noted that not only does heat exchanger 34 vaporize the ammonia-water mixture, it also cools the reactor effluent gases thereby reducing the size required for heat exchanger 36. While the drawing illustrates the use of a pair of heat exchangers and a separator, any number of different arrangements of apparatus may be used for the separation step such as a combination of one or more heat exchangers with one or more integral or distinct separator vessels.

The hydrogen-rich recycle gas stream is then recycled back to the intake manifold of the internal combustion engine where it mixes with combustion air. According to the drawing, the hydrogen-rich recycle gas stream is supplemented by a stream of fuel gas 48. However, in another embodiment, the hydrogen-rich recycle gas is the sole source of fuel for the internal combustion engine. The molar ratio of methane to hydrogen plus carbon monoxide in the fuel fed to the internal combustion engine generally ranges between about 1 and 4, and is preferably about 2.4. When the specific power requirements of the engine are low, a ratio of about 4 may be used. Such ratios can be controlled either by adding supplemental fuel gas to the intake manifold of the internal combustion engine, or by controlling reaction conditions in the reforming reactor.

Within the internal combustion engine, the air and fuel are combusted by well-known techniques to produce useful work and the hot exhaust gas stream. In one embodiment of the invention, the first hot exhaust gas stream constitutes between about 10 and 50%, and preferably between about 20 and 30% of the total hot exhaust gas stream exiting the internal combustion engine. According to another embodiment, the hydrogen-rich recycle gas stream is combined with air in a ratio between about 0.1 and 1 and more preferably between about 0.4 and 0.67.

Because the hot exhaust gas stream contains high levels of noncombustible gases such as water vapor, carbon dioxide, and nitrogen, high levels of charge dilution are achieved. This in turn results in an increased heat capacity for the gases fed to the internal combustion engine. This increase in heat capacity reduces the peak temperature of the combustion process which is very important in reducing $NO_x$ emissions from the internal combustion engine.

However, while some level of charge dilution is desired, it should also be noted that too much dilution of the combustion charge can adversely affect engine performance by causing misfire. This is often the case for internal combustion engines operating on traditional hydrocarbon fuels. Misfire generally results when the charge mixture becomes too lean to support complete combustion. This not only results in a severe drop in engine efficiency, but also results in high emissions of unburned hydrocarbons in the engine exhaust. Consequently, while high levels of charge dilution are desired to produce low $NO_x$ emissions, near-zero $NO_x$ emissions are difficult to achieve because of misfire. However, because hydrogen has a very broad range of flammability, far wider than the flammability ranges of most hydrocarbons, the inclusion of hydrogen in the fuel charge fed to the internal combustion engine permits an engine to operate at higher levels of charge dilution without misfire.

According to one embodiment of the invention, when operating the internal combustion engine, it is desired to operate the engine under a sufficiently lean burn conditions to provide about 0.5 to 11% oxygen in the exhaust gas. The amount of lean burn is controlled by regulating the amount of fuel introduced to the reactor, the amount of fuel introduced directly to the intake manifold, and optionally the amount of air entering the intake manifold. The appropriate amount of fuel can be determined by an oxygen sensor placed in the hot exhaust gas stream. Alternatively, the amount of lean burn can be regulated by knowing the mass flow rate of air and fuel to the internal combustion engine. According to an embodiment of the present invention, an equivalence ratio ($\Phi$) based on fuel to air ratio compared to stoichiometric on a mass basis of 0.98 will produce approximately 0.5% oxygen in the exhaust gas and an equivalence ratio of 0.5 will produce approximately 11% oxygen in the exhaust gas.

It should also be noted that while the drawing FIGURE shows the hydrogen-rich recycle gas entering the internal combustion engine through an intake manifold, various other configurations are possible for introducing the fuel to the engine. For example, the hydrogen-rich recycle gas may be directly injected into one or more combustion chambers of the internal combustion engine. Similarly, while the hot exhaust gas stream may be drawn from a single exhaust manifold and then split to produce the first and second hot exhaust gas streams, other configurations are possible. As one example, if the internal combustion engine is a multiple cylinder engine with a combustion chamber associated with each cylinder, one or more combustion chambers can be dedicated to producing the first hot exhaust gas stream while the remaining combustion chamber or chambers are dedicated to producing the second hot exhaust gas stream. In such a configuration, the two sets of combustion chambers can be independently operated with different air to fuel ratios, different ignition timing, and even different fuels to optimize engine performance or minimize emissions. For example, if the internal combustion engine is a four cylinder spark ignition engine, the first cylinder can be dedicated to producing the first hot exhaust gas stream which is fed to the catalytic reactor while the second, third, and fourth cylinders are dedicated to producing the second hot exhaust gas stream. In such an embodiment, the second, third and fourth cylinders can be operated for optimum engine performance even though such operation may result in higher $NO_x$ levels than the first cylinder. However, the inclusion of the SCR reactor in the emission control system will insure that the treated exhaust stream achieves near-zero $NO_x$ levels.

After being heated in heat exchanger 34 against the hot reactor effluent, the ammonia-rich water (steam) stream is combined with the second hot exhaust gas stream 42 in a selective catalytic reduction (SCR) reactor. There, the $NO_x$ present in the second hot exhaust gas stream reacts with the ammonia according to known reactions to produce nitrogen and water. For nitric oxide and nitrogen dioxide, the reactions are as follows:

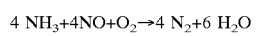

$$4\ NH_3 + 4NO + O_2 \rightarrow 4\ N_2 + 6\ H_2O$$

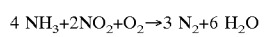

$$4\ NH_3 + 2NO_2 + O_2 \rightarrow 3\ N_2 + 6\ H_2O$$

Other oxides of nitrogen react similarly with ammonia and oxygen to produce nitrogen and water as is well known in the art. The treated exhaust 46 produced from the SCR reactor primarily contains nitrogen, water vapor, carbon dioxide and oxygen, and is substantially free of $NO_x$. Some carbon monoxide may be present, and so, such carbon monoxide can optionally be oxidized to carbon dioxide by the remaining oxygen present in the treated exhaust using a catalytic converter (not shown.) For purposes of this description, the term "near-zero" when used to describe $NO_x$ emissions means that the given stream contains less than about 10 ppm $NO_x$, and when used to describe CO emissions means that the given stream contains less than about 5 ppm CO.

While the invention has been described in terms of preferred embodiments, the claims appended hereto are intended to encompass other embodiments which fall within the spirit of the invention.

What is claimed is:

1. An emission control system for use with a lean burn internal combustion engine of the type receiving a source of fuel and producing a hot exhaust gas stream containing water vapor, nitrogen, $NO_x$, and oxygen, the emission control system comprising:
   a first reactor adapted to receive a first portion of the hot exhaust gas stream and a fuel gas to produce an intermediate exhaust stream containing hydrogen and ammonia;
   a separator adapted to separate the intermediate exhaust stream to a hydrogen-rich stream and an ammonia-rich stream;
   a conduit adapted to recycle the hydrogen-rich stream to the internal combustion engine as at least a portion of the source of fuel; and
   a selective catalytic reduction reactor adapted to treat a second portion of the exhaust gas stream with the ammonia-rich stream and produce a treated exhaust stream substantially free of $NO_x$.

2. The emission control system of claim 1 wherein the fuel gas is selected from the group consisting of methane, ethane, propane, butane, and combinations thereof.

3. The emission control system of claim 1 wherein the fuel gas is natural gas.

4. The emission control system of claim 1 wherein the first reactor includes a first reaction section adapted to reform at least a portion of the fuel gas and water vapor to hydrogen, and a second reaction section adapted to convert at least a portion of the nitrogen and hydrogen to ammonia.

5. The emission control system of claim 1 wherein the first reactor further produces carbon monoxide.

6. The emission control system of claim 1 wherein the separator further comprises a heat exchanger adapted to condense water and ammonia from the intermediate exhaust stream, thereby producing the ammonia-rich stream.

7. The emission control system of claim 1 wherein at least about 2% of the fuel gas is converted in the first reactor.

8. The emission control system of claim 1 further comprising an oxidation reactor for oxidizing carbon monoxide in the treated exhaust stream, thereby producing a treated exhaust gas stream substantially free of carbon monoxide.

9. The emission control system of claim 1 wherein the hot exhaust gas stream contains at least about 0.5% oxygen.

10. The emission control system of claim 1 wherein the internal combustion engine includes a plurality of combustion chambers, the first portion of the hot exhaust gas stream is produced from at least one combustion chamber and the second portion of the hot exhaust gas stream is produced from the remaining combustion chambers.

11. A method for reducing the emissions from a lean burn internal combustion engine of the type receiving a source of fuel and producing a hot exhaust gas stream containing water vapor, nitrogen, $NO_x$, and oxygen the method comprising the steps of:
    a first reaction step for reacting a first portion of the hot exhaust gas stream with a source of fuel gas in a reactor to produce an intermediate exhaust stream containing hydrogen and ammonia;
    separating the reformed exhaust stream to a hydrogen-rich stream and an ammonia-rich stream;
    recycling the hydrogen-rich stream to the internal combustion engine as at least a portion of the source of fuel; and
    a second reaction step for reacting a second portion of the exhaust gas stream with the ammonia-rich stream to produce a treated exhaust stream substantially free of $NO_x$.

12. The method of claim 11 further comprising the step of selecting a fuel gas from the group consisting of methane, ethane, propane, butane, and combinations thereof.

13. The method of claim 11 wherein the fuel gas is natural gas.

14. The method of claim 11 wherein the first reaction step comprises a reforming reaction step for reforming hydrocarbon fuel and water vapor to hydrogen, and an ammonia production step for converting nitrogen to ammonia.

15. The method of claim 11 wherein the first reaction step further produces carbon monoxide.

16. The method of claim 11 wherein the separating step further includes a step for condensing water and ammonia from the intermediate exhaust stream.

17. The method of claim 11 wherein at least about 2% of the fuel gas is converted by the first reaction step.

18. The method of claim 11 further comprising an oxidation step for oxidizing carbon monoxide in the treated exhaust stream, thereby producing a treated exhaust gas stream substantially free of carbon monoxide.

19. The method of claim 11 wherein the hot exhaust gas stream contains at least about 0.5% oxygen.

20. The method of claim 11 further comprising the step of selecting an internal combustion engine with a plurality of combustion chambers, wherein the first portion of the hot exhaust gas stream is produced from at least one combustion chamber and the second portion of the hot exhaust gas stream is produced from the remaining combustion chambers.

* * * * *